(12) United States Patent
Baransky et al.

(10) Patent No.: US 7,315,950 B1
(45) Date of Patent: Jan. 1, 2008

(54) METHOD OF SECURELY SHARING INFORMATION OVER PUBLIC NETWORKS USING UNTRUSTED SERVICE PROVIDERS AND TIGHTLY CONTROLLING CLIENT ACCESSIBILITY

(75) Inventors: Yurij Andrij Baransky, Montrose, NY (US); Hubertus Franke, Cortlandt Manor, NY (US); Pratap Chandra Pattnaik, Ossining, NY (US); David R. Safford, Brewster, NY (US); Robert William Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/468,377

(22) Filed: Dec. 20, 1999

(51) Int. Cl.
*G06F 21/00* (2006.01)
(52) U.S. Cl. ..................................... 713/193
(58) Field of Classification Search ............. 713/202, 713/193, 185; 380/283, 284, 281, 277, 280, 380/45
See application file for complete search history.

(56) References Cited

U.S. PATENT DOCUMENTS

| | | | | |
|---|---|---|---|---|
| 4,200,770 A | * | 4/1980 | Hellman et al. | ............... 380/30 |
| 5,604,803 A | * | 2/1997 | Aziz | ........................... 713/155 |
| 5,757,920 A | * | 5/1998 | Misra et al. | ................. 713/158 |
| 5,768,373 A | * | 6/1998 | Lohstroh et al. | ............. 380/286 |
| 5,875,296 A | * | 2/1999 | Shi et al. | ..................... 713/202 |
| 6,226,383 B1 | * | 5/2001 | Jablon | .......................... 380/30 |
| 6,389,535 B1 | * | 5/2002 | Thomlinson et al. | ........ 713/165 |
| 6,418,472 B1 | * | 7/2002 | Mi et al. | ..................... 709/229 |
| 6,460,141 B1 | * | 10/2002 | Olden | .......................... 713/201 |
| 6,571,339 B1 | * | 5/2003 | Danneels et al. | ............ 713/201 |

OTHER PUBLICATIONS

Schneier, Bruce, Applied Cryptography, 1996, John Wiley & Sons, Inc, Second Edition, pp. 455-456.*
IBM Technical Disclosure, Mar. 1, 1995, p. No. 245-248. TDB-ACC-NO NN9503245.*
Steven Bellovin, Encrypted Key Exchange: Password-Based Protocols Secure Against Dictionary Attacks, May 1992.*

* cited by examiner

*Primary Examiner*—Kambiz Zand
*Assistant Examiner*—Andrew L Nalven
(74) *Attorney, Agent, or Firm*—Douglas W. Cameron; Anne Vachon Dougherty

(57) ABSTRACT

A method for allowing a content provider to restrict access to data without having to trust a service provider. With this invention a content provider is able to restrict access to data to a specific client using a specific machine. A content provider generates a first key which is used to encrypt a second key where the second key will only be encrypted if the user has a one-time password. The encrypted second key is then stored on the client machine. When the user desires to access the data of the content provider, the second key is decrypted and used to access the data.

20 Claims, 3 Drawing Sheets

Table of Information kept by Content Provider

| Users | IDm | IDu | PWu | Kab |
|---|---|---|---|---|
| User1 | | | | |
| User2 | | | | |
| User3 | | | | |
| User4 | | | | |

Fig. 3

METHOD OF SECURELY SHARING INFORMATION OVER PUBLIC NETWORKS USING UNTRUSTED SERVICE PROVIDERS AND TIGHTLY CONTROLLING CLIENT ACCESSIBILITY

TECHNICAL FIELD

This invention relates to the field of securely sharing information over a public network.

BACKGROUND OF THE INVENTION

The internet has emerged as a fundamental medium of public communication. Nevertheless, restricting access from the general public to a selected subset is useful as evidenced by the growing use of firewalls and encryption technologies. There are also different schemes such as the Secure Sockets Layer (SSL) that provide for restricted access to a set of web pages.

However, these techniques depend critically on the service provider to ensure that access policies are enforced based on IP addresses (firewalls) or passwords and keys (encryption, SSL). While for large companies this may be a suitable technique, for individuals or for small companies using a service provider this technique is questionable because they must place trust in a third party. All methods, including those trusting the service providers, allow a proliferation of accessibility once one client can enter the protected area. For example, a scheme with a userid and password can easily be, and is frequently, distributed along insecure channels (e.g., verbal communication, e-mail, or worse posting on the net), thus preventing the provider from maintaining control over who has access to the content.

Data encryption systems are well known in the data processing art. In general, such systems operate by performing an encryption operation on a plaintext input block, using an encryption key, to produce a ciphertext output block. The receiver of an encrypted message performs a corresponding decryption operation, using a decryption key, to recover the original plaintext block. The goal of encryption is confidentiality, that is to prevent anyone other than holders of the key from reading the data.

Encryption systems fall into two general categories. Symmetric (or secret key) encryption systems such as the Data Encryption Standard (DES) system use the same secret key for both encrypting and decrypting messages. In the DES system, a key having 56 independently specifiable bits is used to convert 64-bit plaintext blocks to ciphertext blocks, or vice versa. Asymmetric (or public key) encryption systems, on the other hand, use different keys that are not feasibly derivable from one another for encryption and decryption. A person wishing to receive messages generates a pair of corresponding encryption and decryption keys. The encryption key is made public, while the corresponding decryption key is kept secret. Anyone wishing to communicate with the receiver may encrypt a message using the receiver's public key. Only the receiver may decrypt the message, however, since only he has the private key.

In addition to confidentiality, two other goals of cryptographic systems are authentication and integrity. Authentication is concerned with verifying the identity of the sender of the received data, and integrity is concerned with verifying that the data has not been modified. Authentication and integrity of data are often combined in a Message Authentication Code (MAC), which cryptographically verifies both properties.

Secure Sockets Layer (SSL) is a cryptographic protocol for use in web communication, which is designed to provide authenticity, integrity, and confidentiality. This protocol is integrated into many web server and client software packages, but the web server must be configured by the service provider to use SSL, and the content owners are typically unable to control its use.

As the desire of individuals to produce personal pages to be shared with a selected set of geographically dispersed clients (e.g. family members) grows, and as the number of small businesses (those without internal ISP support, i.e., those that rely on service providers) who sell products over the web grows, there arises an increased need to provide security. Specifically, the security model desired by these groups of content providers is one with which they can personally guarantee, without having to trust their service provider, and a model with which they can maintain tight control on which clients have access to their content.

SUMMARY OF THE INVENTION

This invention provides a method for allowing a content provider to restrict access to a collection of web pages or information without the involvement of a service provider. Access is controlled with a one-time handshaking protocol established between the content provider and a client or user using a specific machine. Through a secure exchange of information during this handshaking protocol, a client using a specific machine is uniquely identified for the purposes of accessing the information or web pages subsequent to the completion of the handshaking protocol. The same user or client can not access the information from another machine. Thus, with this invention, a virtual private network is established that gives protected content information only to authorized users using specific machines. Since the protected content is encrypted when it is transmitted to the specific machine the service provider does not have access to the content at transmittal point. Further, even though the data is stored on the content provider's disk, it is stored in an encrypted form with only the content provider knowing the decryption key. Thus, both during storage and transmittal, the data is encrypted and neither the service provider nor an unintended third party has access to the data.

Thus, it is an object of this invention to pass information from a content provider to a specific user on a specific machine without having to trust a service provider.

It is another more specific object of this invention to control access to content by restricting the number of different machines from which a user may access the protected content.

It is also a more specific object of this invention to prevent the practice of a client giving out his or her user ID and password to allow any other user to access the protected content from any machine.

It is also an object of this invention to provide for the protection of content without the need for creation and maintenance of public/private keys.

Preventing proliferation of access is accomplished by doling out one-time keys that are used to establish a mapping between the client machine and the content provider. The one-time key includes a unique number generated by the content provider. Upon receiving an initialization request, the content provider queries the client machine for a unique piece of information identifying the machine. That information is securely transmitted back to the content provider and an encrypted, opaque cookie is stored on the client's machine for future accesses. After initialization, when the client attempts access to the content provider's web page, both the cookie and the unique piece of information tied to this machine are required to gain access. An applet is downloaded upon discovering a special encrypted web page, and the applet finds a cookie associated with a tag provided by the content provider. The applet looks up the required part of the unique piece of information identifying the machine, sends it to the content provider, and access to the page is granted after the information is verified. As an extra measure of security, for local control, or for use in a shared environment, a userid/password pair can be asked for at this point.

BRIEF DESCRIPTION OF THE DRAWINGS

FIG. 3 is a table maintained by the content provider showing the mapping between the userid-id and machine-id, the one-time password, and the session key.

DESCRIPTION OF THE PREFERRED EMBODIMENT

Figure 1:
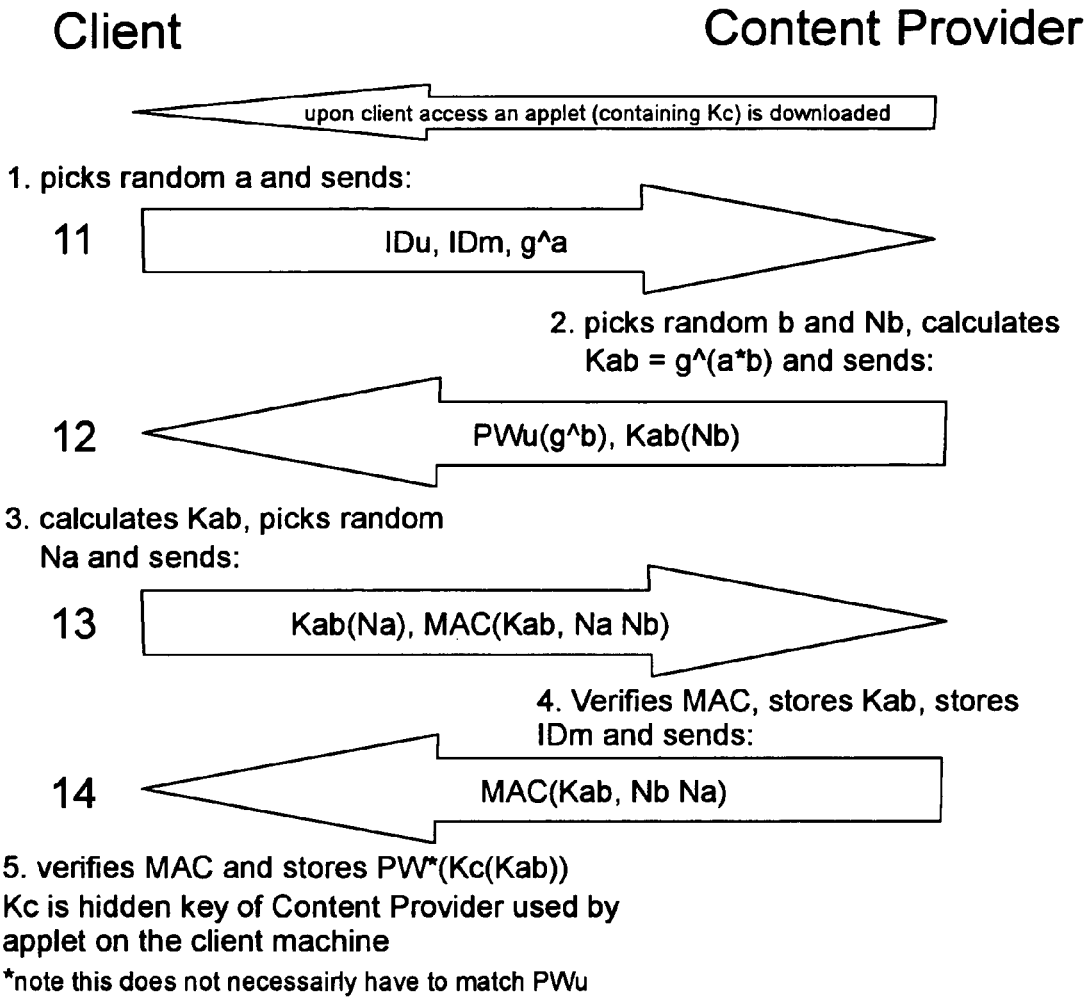
FIG. 1. Illustrates initialization phase, which is the series of actions that need to occur the first time a new user accesses the web page.

From a client's perspective accessing an encrypted web page as provided by this invention appears identical to the access of any other web page. The only difference is that the first time the client accesses the web page, a userid and a one-time password will be required. Thereafter, the software on the client's machine will coordinate with the security software of the server's machine to seamlessly provide the web pages as if the encryption did not exist.

NOTATIONS USED IN THIS APPLICATION $IDu$—unique identification of user $IDm$—unique identification of machine $PWu$—a one time user password $Ka$—a symmetric encrypting key $Na$—random nonce $a*b$—a multiplied by b $Ka(b)$—data b is encrypted with symmetric key Ka $g$—preselected common base $g\hat{\,}a$—g to the power a $ab$—concatenate *(put together) "a" and b MAC—Message Authenticated Code
  A MAC is a keyed hash that strongly authenticates a message. If any bit is changed or incorrect in the hash sequence it is detectable and interpreted as being the incorrect code.

$MAC(a, bc)$—perform a MAC with a and with the key which is b concatenated with c.

The following definitions are used throughout this embodiment:

Content Provider—a user that makes a web page or other information available for access by other users on the net. The content provider is also referred to as the server because it is the content provider that is providing or serving the web pages.

Service Provider—a company that provides disk space and internet access.

Client—also referred to as user—a user that is interested in viewing information provided by the Content Provider For a user or client to obtain the capability of accessing an encrypted web page provided by a server (content provider), a userid IDu needs to be assigned to the client, and a one-time password PWu needs to be given to the user. The transport of the IDu and one-time password PWu can be by any means, e.g. e-mail, U.S. mail, phone, etc. Once this transport occurs and prior to standard access of the encrypted web page, a one-time initialization phase needs to occur (See FIG. 1). The purpose of this initialization phase is to create a one-to-one mapping between the client and the identity of the machine (IDm) the client is using. This phase is mostly hidden from the client except that at first access the client will be asked to provide the userid (IDu) and a one-time password (PWu) that were provided to the client as indicated above. The request for IDu and PWu will be generated by an applet that is downloaded to the client's machine from the server's machine upon access to the encrypted web page. Once IDu and PWu are provided by the client, the establishment phase occurs automatically, and all future references to the web page occur without prompting the client for IDu and PWu. Note, that content providers, such as companies selling information via web pages, are not precluded from continuing to require a userid and password upon each new entrance to their site. With this invention, clients can no longer give out their userid and password to other clients because there is also a machine-id (IDm).

As mentioned, the first time a client accesses an encrypted web page, an initialization phase needs to occur. This phase establishes the one-to-one mapping between the client and client's machine as kept track of in FIG. 3. This phase is visible to the user only in that the user is prompted for a userid and one-time password. Conceptually, what occurs during this phase is that the server (content provider) executes a protocol to establish a unique relationship with a client and machine pair. By default, for IDm, the invention uses a varying subset of the unique hardware network identifying address. This identifier can be the unique identifier on the network card on every machine, or other unique identifier e.g., pentium III cpu-id. The invention can be augmented to take advantage of a smart card. A smart card is hardware plugged into the client machine that generates unique and varying keys in a way that guarantees the machine is what it claims to be and as such provides much stronger guarantees.

Upon any incoming request for the web page, an applet is downloaded to the client's machine to identify the accessing computer. This applet contains Kc and thus can decrypt the encrypted Kc(Kab) key stored on the client machine. As the applet is loaded, a varying set of bits from IDm is requested. The initialization phase as shown in FIG. 1 is initiated if the applet returns bits from an unknown IDm to the content provider's machine. When the server finds that it is not aware of the requesting clients machine, it has the applet execute the first step (11) in FIG. 1. As part of this first step, the applet obtains the whole unique machine identifier (IDm), prompts the user for his or her userid (IDu), calculates $G\hat{\,}a$ (where G and a are random numbers) and transmits these three items back to the server. In step 12 of FIG. 1, the server generates random numbers b and Nb, generates $G\hat{\,}b$ and $G\hat{\,}(a*b)=Kab$, encrypts $G\hat{\,}b$ with the one-time password PWu, and encrypts Nb with Kab. The results of step 12 are transmitted to the client machine. When the client machine receives these results, the user is prompted for the one-time password, which can be used to decrypt the encrypted G^b, where G^b is used to calculate Kab, which in turn is used to determine Nb. If the client fails to correctly provide PWu then the algorithm with failure; no cookie gets stored on the client machine with the result being this client has not gained access to the content provider's data. If the correct PWu is provided, the applet generates a random number Na, encrypts Na with the session key Kab, and performs a Message Authenticated Code (MAC) on $K_{ab}$ and NaNb. See step 13 in FIG. 1. The applet then sends the results as shown in step 13 to the server. The server verifies the MAC operation, stores the session key $K_{ab}$ and the userid-machine ID pair, and sends MAC (Kab, NaNb) to the client machine. See step 14 in FIG. 1. The client then verifies the MAC to make sure that the previous message in 14 actually came from the server. The client machine then stores an encrypted version of the session key (Kc) (Kab), where the encrypted version of the session key will be used to subsequently access the web page. As an additional measure of security, recommended on multi-user systems, the user can be prompted for a separate password (different from PWu). This password is used to encrypt the Kc(Kab) so only this user of the system can gain access. At this point, the initialization phase is now complete. The server has securely created a mapping between the userid (IDu) and the machine (IDm), and the server has stored the IDu and the IDm for future allowing the client to subsequently access the web page. The server also has stored the session key $K_{ab}$ which will be used to securely communicate with the client. See FIG. 3 for the data structure used to store the above mentioned information. The protocol immediately moves to the access phase. Future references also proceed to the access phase since once the applet is downloaded it will recognize that the client's browser has a cookie associated with this content provider's page.

Note: The password PWu is considered one time because it is never used again. It is used only during the initialization phase to establish the user:machine mapping. Observe that a potential security problem exists if someone steals and uses the userid and password before the intended client is able to use them. The security exposure is therefore limited to the time frame of sending out a one-time password until its usage at initial access. The access can easily be retracted in the event the intended individual was not the client that made use of the one-time password. Thus, a follow up with the expected client would be prudent. However, as soon as the client notifies the content provider that they have not accessed the page, even though the server thinks they have, the userid can be revoked and the process redone. The power of the one-time password linked to establishing the unique user:machine mapping is that it prevents the proliferation of accessibility to the server, i.e., once the client uses the password it is never again useful for friend or foe. Note that this also prevents the client from being able to access the web page from multiple machines or access points. This problem is easily remedied by just providing two one-time passwords to such a user. What the invention does allow, however, is for the content provider to obtain very strict control over how widespread the ability to access this page or information is.

Figure 2:
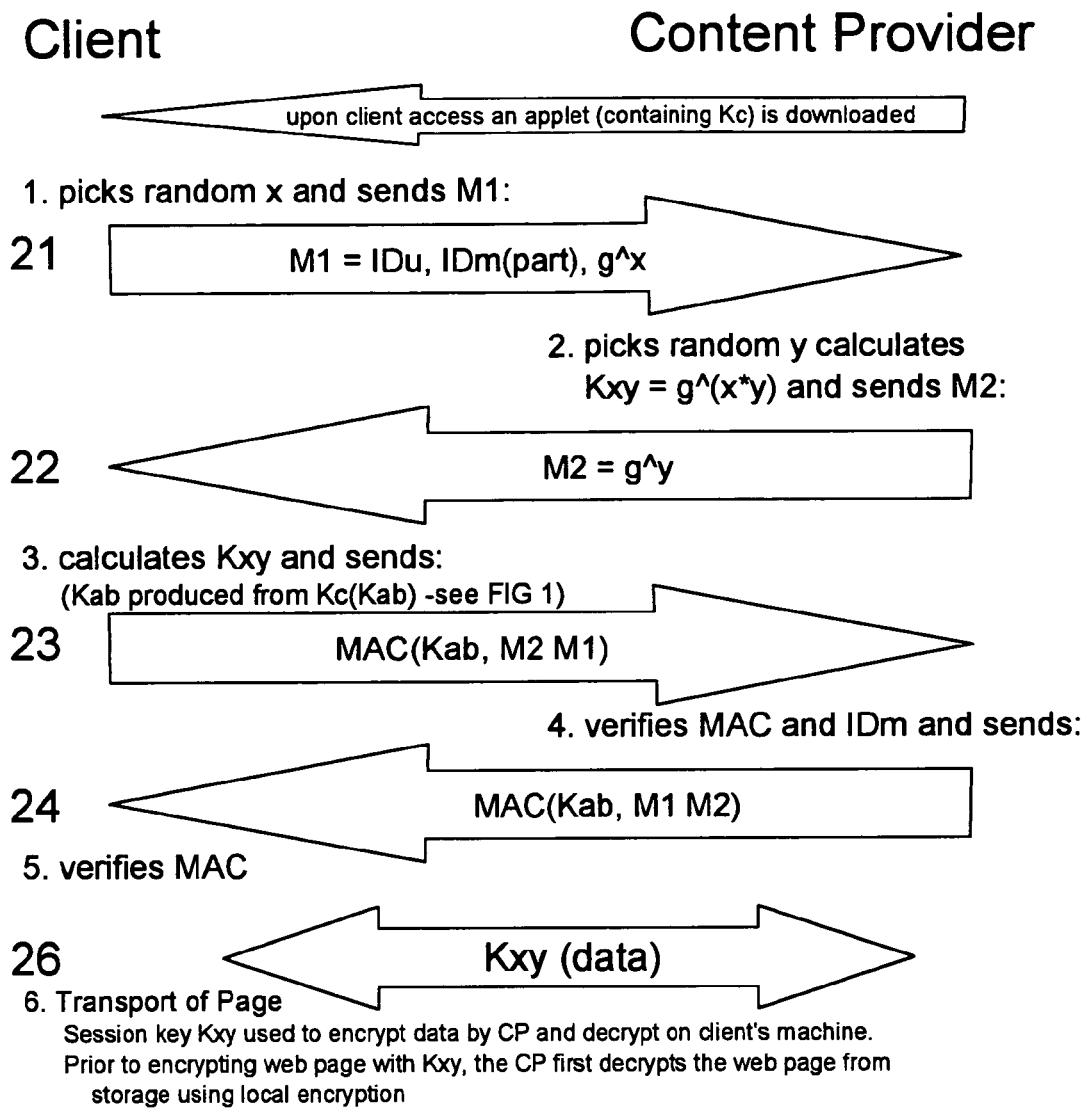
FIG. 2. Illustrates the access phase, which is the series of actions that occur each time a known user access the web page.

Referring to FIG. 2, the first step of the access phase begins with the applet picking a random x and sending a scrambled and varying subset of the machine IDm. This applet, as in the previous discussion, is downloaded to the client's machine (and contains Kc) when the client accesses the content provider's data. The applet also sends the userid and g^x. See 21 of FIG. 2. The server verifies that the subset of bits from the machine id IDm matches what it expected from the user id. If there is a match, the content provider generates a random y and sends g^y, else it just sends an authentication failure message to the user. (22 in FIG. 2). Upon receiving g^y, i.e., success, the applet performs a MAC with key Kab, and sends MAC(Kab, M2M1) to the server, where M1=(IDu, ID'm, g^x) and where M2=g^(y), where x is a random number generated by the client machine, and where y is a random number generated by the content provider. This is accomplished because the applet knows Kc and can thus decrypt Kc(Kab). If there was an additional optional separate user-provided password (as described in the above embodiment) then the user will be prompted for that. The client's response proves that it has seen M1 and M2 and knows Kab. (23 in FIG. 2). The server verifies the MAC, and sends MAC(Kab, M1M2) back to the client. This last step proves to the client that the server is who it is claiming to be and nobody else is masquerading as the server (24 in FIG. 2). The Content Provider decrypts the page with its own encryption key, and re-encrypts it with the new session key (Kxy). Since the content is encrypted when it is transmitted to the specific machine the service provider does not have access to the content at the transmittal point. Further, even though the data is stored on the content provider's disk, it is stored in an encrypted form with only the content provider knowing the decryption key. Thus, both during storage and transmittal, the data is encrypted and neither the service provider nor an unintended third party has access to the data. Once the data is re-encrypted and securely delivered to the client, the applet can now use the new session key to decrypt the page and display the content for the user (26 in FIG. 2).

Having thus described our invention, what we claim as new, and desire to secure by Letters Patent is:

1. A method in a distributed network for establishing a secure connection by peer-to-peer communication for securely providing data of a content provider to a user at a client machine having a client key a without trusting an internet service provider, wherein the content provider and internet service provider are different entities, said method comprising:
   a. randomly generating a first key b which is known to said content provider and need not be known to said user;
   b. generating a second key g^b using said first key b and g and an encryption algorithm requiring a one-time password;
   c. transmitting said encrypted second key g^b to the client machine;
   d. storing said encrypted second key g^b on the client machine; and
   when said user first desires to access said data:
   e. decrypting said encrypted second key g^b using said one-time password;
   f. generating an encryption key $K_{ab}$ using a and g^b; and
   g. accessing said data by decrypting an encrypted version of said data at said client machine using said encryption key.

2. A method as recited in claim 1, further comprising the step of transmitting the identity of said client machine to said content provider to authenticate that said user is using said client machine, thereby permitting said data to be accessed only on said client machine.

3. A method as recited in claim 1, wherein said one-time password is a unique user identifier and wherein said one-time password is transmitted out of band.

4. A method as recited in claim 1, wherein said second key is required in an algorithm that generates a session key which is used to decrypt said data.

5. The method as recited in claim 2, wherein said content provider stores a mapping between said user and said client machine and wherein, when said user subsequently seeks to access additional data from said content provider, said method further comprises the steps of:
- authenticating the user to said content provider based on said stored mapping;
- generating a new encryption key based on said second key;
- encrypting said additional data with said new encryption key;
- transmitting said encrypted additional data to said client machine whereat the new encryption key is decrypted using said second key and said encrypted additional data is decrypted using said new encryption key.

6. A method for securely providing data of a content provider through an internet service provider to a user at a client machine having a client key a without trusting an internet service provider, wherein said content provider and said internet service provider are different entities, said method comprising:
- a. when said user accesses a web page of said content provider, downloading an applet from said content provider to said client machine;
- b. randomly generating a first key b which is known to said content provider and need not be known to said user;
- c. generating a second key g^b using said first key b and g and an encryption algorithm requiring a one-time password;
- d. transmitting said second encrypted key g^b for storage of said encrypted second key on a client machine; and when said user first desires to access said data:
- e. said applet requesting said one-time password from said user and, based on correct entry of said one-time password, decrypting said second encrypted key g^b; and
- f. accessing said data by decrypting an encrypted version of said data at said client machine using said second key wherein said decrypting comprises:
  generating an encryption key $K_{ab}$ using a and g^b; and using $K_{ab}$ to decrypt the data.

7. A method as recited in claim 6, further comprising the step of transmitting the identity of said client machine to said content provider to authenticate that said user is using said client machine, thereby permitting said data to be accessed only on said client machine.

8. The method as recited in claim 7, wherein said content provider stores a mapping between said user and said client machine and wherein, when said user subsequently seeks to access additional data from said content provider, said method further comprises the steps of:
- authenticating the user to said content provider based on said stored mapping;
- generating a new encryption key based on said second key;
- encrypting said additional data with said new encryption key;
- transmitting said encrypted additional data to said client machine whereat the new encryption key is decrypted using said second key and said encrypted additional data is decrypted using said new encryption key.

9. A method as recited in claim 6, wherein said one-time password is a unique user identifier and wherein said one-time password is transmitted out of band.

10. A method as recited in claim 6, wherein said second key is required in an algorithm that generates a session key which is used to decrypt said data.

11. In a distributed communications network having at least a content provider node and a plurality of client machines, a method of peer-to-peer authenticating a user at one client machine seeking access to secure data of said content provider, wherein said user accesses said content provider through an internet service provider and wherein said internet service provider and said content provider are different entities, said method comprising:
- a. transmitting g^a and the identity of the user of said one client machine to said content provider node, wherein g and a are random numbers and where a is known only to said client machine and is not known by said content provider, and where g is known to both content provider and said client machine;
- b. generating g^b, where b is randomly chosen by and known to said content provider node and need not be known to said user;
- c. encrypting g^b with a one-time password of said user and transmitting g^b to said client machine;
- d. decrypting said encrypted g^b using said one-time password;
- e. generating an encryption key Kab using a and g^b;
- f. calculating g^(a*b);
- g. encrypting g^(a*b) using said encryption key $K_{ab}$; and
- h. transmitting g^(a*b) to said content provider, whereby said client machine's knowledge of g^(a*b) authenticates said user to said content provider.

12. A method as recited in claim 11, further comprising the step of transmitting the identity of a particular one of said client machines to said content provider to authenticate that said user is using said client machine, thereby permitting said data to be accessed only on said client machine.

13. The method as recited in claim 12, wherein said content provider stores a mapping between said user and said client machine and wherein, when said user subsequently seeks to access additional data from said content provider, said method further comprises the steps of:
- authenticating the user to said content provider based on said stored mapping;
- generating a new encryption key based on g^(a*b);
- encrypting said additional data with said new encryption key;
- transmitting said encrypted additional data to said client machine whereat the new encryption key is decrypted using g^(a*b) and said encrypted additional data is decrypted using said new encryption key.

14. A method as recited in claim 11, further comprising the step of performing a method authenticated code on g^(a*b) at said content provider and transmitting the results of performing said method authenticated code to said client, where said client machine verifies said results to authenticate said content provider.

15. A program storage device readable by a machine, tangibly embodying a program of instructions executable by the machine to perform method steps for securely providing data of a content provider to a user at a client machine having a client key a, wherein data is transmitted to said user from said content provider through an internet service provider and wherein said content provider and internet service provider are different entities, said method comprising:
- a. randomly generating a first key b which is known to said content provider and need not be known to said user;

b. generating a second key g^b using said first key b and g and an encryption algorithm requiring a one-time password;

c. transmitting said encrypted second key g^b to the client machine;

d. storing said encrypted second key g^b on the client machine; and when said user desires to first access said data:

decrypting said second encrypted key g^b using said one-time password;

generating an encryption key $K_{ab}$ using a and g^b; and accessing said data by decrypting an encrypted version of said data at said client machine using said encryption key.

16. A program storage device readable by a machine, tangibly embodying a program of instructions executable by the machine to perform method steps for securely providing data of a content provider to a user at a client machine having a client key a, wherein data is transmitted to said user from said content provider through an internet service provider and wherein said content provider and internet service provider are different entities, said method comprising:

a. when said user accesses a web page of said content provider, downloading an applet from said content provider to said client machine;

b. generating a first key b which is known to said content provider and need not be known to said user;

c. generating a second key g^b using said first key and q and an encryption algorithm requiring a one-time password; and d. transmitting said second encrypted key g^b for storage of said encrypted second key on a client machine;

wherein, when said user first desires to access said data:

said applet requesting said one-time password from said user and, based on correct entry of said one-time password, decrypting said second encrypted key g^b;

generating an encryption key $K_{ab}$ using a and g^b; and accessing said data by decrypting an encrypted version of said data at said client machine using said encryption key.

17. A program storage device readable by machine, tangibly embodying a program of instructions executable by the machine to perform method steps in a communications network having at least a content provider node and a plurality of client machines, said method steps authenticating a user of one client machine seeking access to secure data of said content provider, wherein data is transmitted to said user from said content provider through an internet service provider and wherein said content provider and internet service provider are different entities, said method steps comprising:

a. transmitting g^a and the identity of the user of said one client machine to said content provider node, wherein g and a are random numbers and where a is known only to said client machine and is not known by said content provider, and where g is known to both content provider and said client machine;

b. generating g^b, where b is randomly chosen by and known to said content provider node and need not be known to said user;

c. encrypting g^b with a one-time password of said user and transmitting g^b to said client machine;

d. decrypting said encrypted g^b using said one-time password;

e. generating an encryption key $K_{ab}$ using a and g^b;

f. calculating g^(a*b);

g. encrypting g^(a*b) using said encryption key $K_{ab}$; and h. transmitting g^(a*b) to said content provider, whereby said client machine's knowledge of g^(a*b) authenticates said user to said content provider.

18. A computer program product for securely providing data of a content provider to a user at a client machine having a client key a without first trusting an internet service provider, wherein data is transmitted to said user from said content provider through an internet service provider and wherein said content provider and internet service provider are different entities, said computer program product comprising:

a. first instruction means for generating a first key b which is known to said content provider and need not be known to said user;

b. second instruction means for generating a second key g^b using said first key b and g and an encryption algorithm requiring a one-time password;

c. third instruction means for transmitting said encrypted second key g^b to the client machine for storage of said encrypted second key g^b on the client machine;

when said user desires to first access said data:

decrypting said second encrypted key g^b using said one-time password;

generating an encryption key $K_{ab}$ using a and g^b; and accessing said data by decrypting an encrypted version of said data at said client machine using said encryption key.

19. A computer program product for securely providing data of a content provider to a user at a client machine having a client key a without trusting an internet service provider, wherein data is transmitted to said user from said content provider through an internet service provider and wherein said content provider and internet service provider are different entities, said computer program product comprising:

a. first instruction means for downloading an applet from said content provider to said client machine upon user access to a content provider web page;

b. second instruction means for generating a first key b which is known to said content provider and need not be known to said user;

c. third instruction means for generating a second key g^b using said first key b and g and an encryption algorithm requiring a one-time password; and d. fourth instruction means for transmitting said encrypted second key g^b to said client machine for storage of said encrypted second key g^b on a client machine;

wherein when said user first desires to access said data:

said applet requesting said one-time password from said user and, based on correct entry of said one-time password, said second encrypted key g^b is decrypted;

generating an encryption key $K_{ab}$ using a and g^b; and accessing said data by decrypting an encrypted version of said data at said client machine using said encryption key.

20. A computer program product for use in a communications network having at least a content provider node and a plurality of client machines, said computer program for authenticating a user at one client machine seeking access to secure data of said content provider, wherein data is transmitted to said user from said content provider through an internet service provider and wherein said content provider and internet service provider are different entities, said computer program product comprising:

a. transmitting g^a and the identity of the user of said one client machine to said content provider node, wherein g and a are random numbers and where a is known only to said client machine and is not known by said content provider, and where g is known to both content provider and said client machine;

b. generating $g^b$, where b is randomly chosen by and known to said content provider node and need not be known to said user;

c. encrypting $g^b$ with a one-time password of said user and transmitting $g^b$ to said client machine;

d. decrypting said encrypted $g^b$ using said one-time password;

e. generating an encryption key Kab using a and $g^b$;

f. calculating $g^{(a*b)}$;

g. encrypting $g^{(a*b)}$ using said encryption key $K_{ab}$; and h. transmitting $g^{(a*b)}$ to said content provider, whereby said client machine's knowledge of $g^{(a*b)}$ authenticates said user to said content provider.

* * * * *